(12) United States Patent
Dudar

(10) Patent No.: US 10,337,440 B1
(45) Date of Patent: Jul. 2, 2019

(54) SYSTEM AND METHOD FOR ENGINE POPPET VALVE DIAGNOSTICS

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/896,907

(22) Filed: Feb. 14, 2018

(51) Int. Cl.
| | | |
|---|---|---|
| F01L 1/34 | (2006.01) |
| F02D 41/22 | (2006.01) |
| F02D 17/02 | (2006.01) |
| F02D 13/06 | (2006.01) |
| F02D 41/14 | (2006.01) |
| F02D 13/02 | (2006.01) |
| F02D 41/12 | (2006.01) |
| F02D 41/00 | (2006.01) |

(52) U.S. Cl.
CPC ........ *F02D 41/221* (2013.01); *F02D 13/0211* (2013.01); *F02D 13/06* (2013.01); *F02D 17/02* (2013.01); *F02D 41/123* (2013.01); *F02D 41/1446* (2013.01); *F02D 2041/0012* (2013.01)

(58) Field of Classification Search
CPC .. F02D 41/221; F02D 41/1446; F02D 41/123; F02D 13/0211; F02D 13/06; F02D 17/02; F02D 2041/0012
See application file for complete search history.

(56) References Cited

U.S. PATENT DOCUMENTS

| | | |
|---|---|---|
| 8,006,670 B2 | 8/2011 | Rollinger et al. |
| 2010/0175463 A1* | 7/2010 | Doering ................. F02D 13/06 73/114.37 |

OTHER PUBLICATIONS

Dudar, A., "System and Method for Diagnosing a Variable Displacement Engine," U.S. Appl. No. 15/608,306, filed May 30, 2017, 40 pages.

* cited by examiner

*Primary Examiner* — Zelalem Eshete
(74) *Attorney, Agent, or Firm* — Julia Voutyras; McCoy Russell LLP

(57) ABSTRACT

Systems and methods for determining operation of a cylinder deactivating/reactivating device are disclosed. In one example, a warm engine is rotated without being supplied fuel to determine the presence or absence of valve actuator degradation. Degraded valve actuators may be determined when there is a lack of a temperature rise in the engine exhaust system.

20 Claims, 7 Drawing Sheets

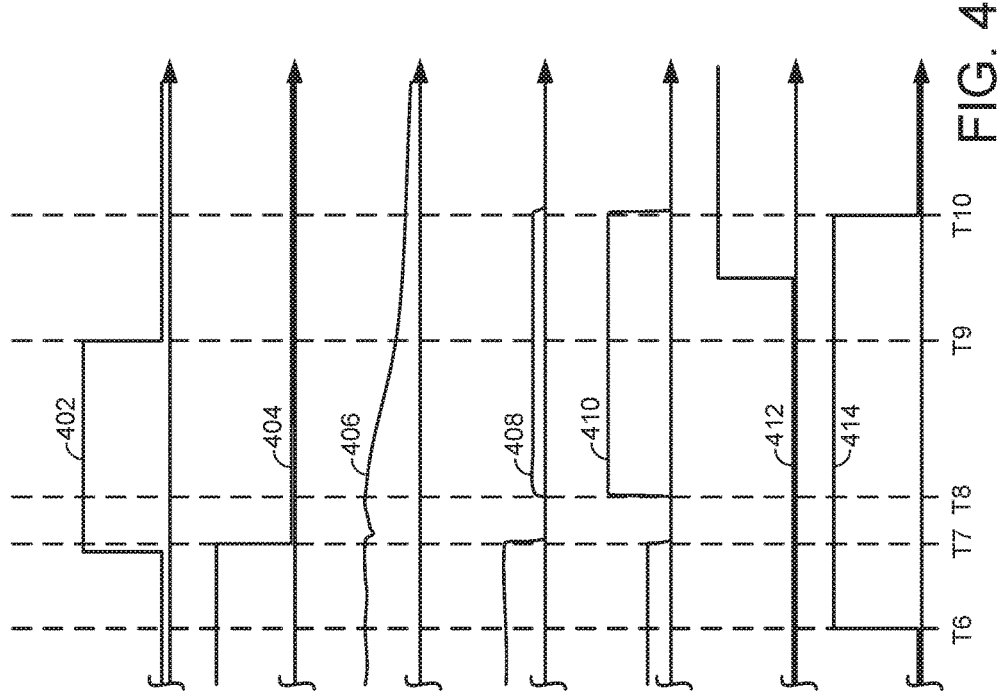
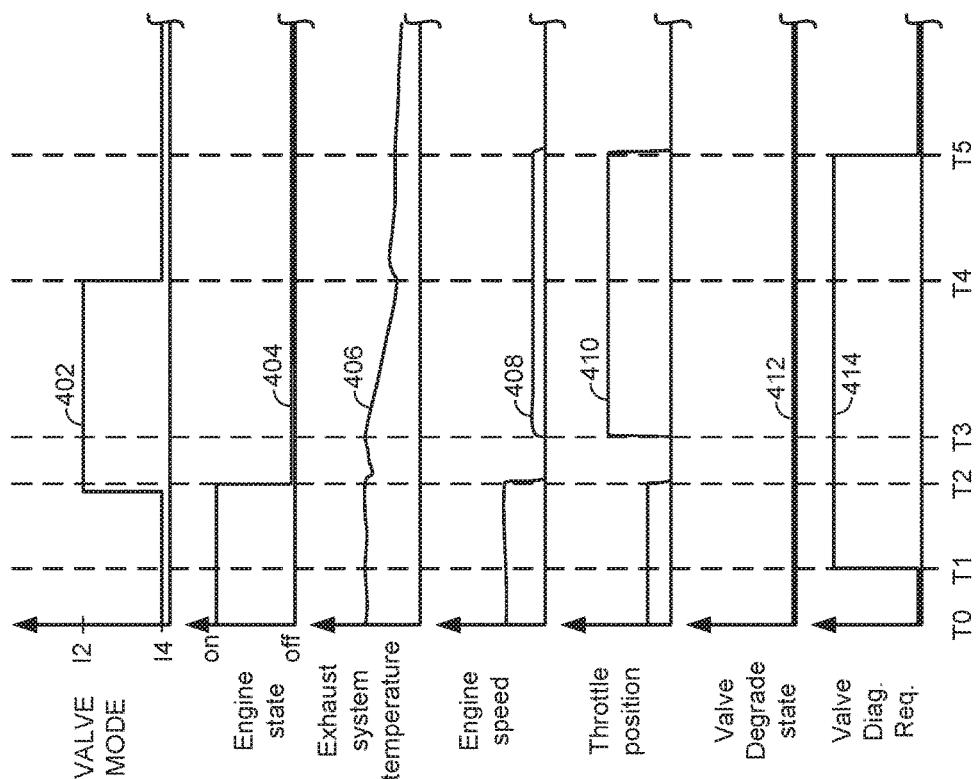
FIG. 4

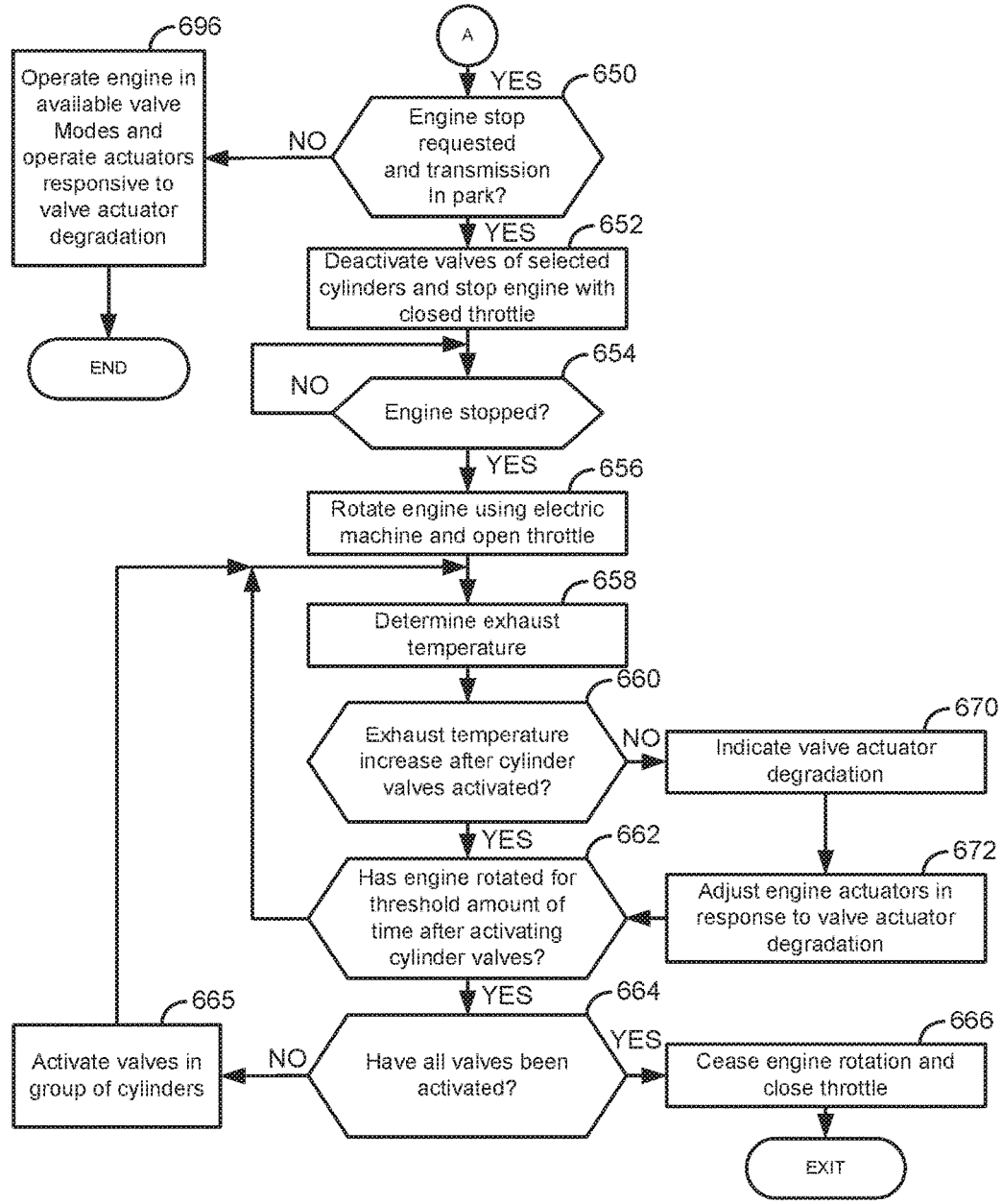

SYSTEM AND METHOD FOR ENGINE POPPET VALVE DIAGNOSTICS

BACKGROUND AND SUMMARY

Intake poppet valves and exhaust poppet valves of an engine cylinder may be selectively deactivated to conserve fuel. The intake and exhaust valves may be selectively activated and deactivated via electromechanical actuators that may from time to time leave the valves in a deactivated state. On the other hand, the electromechanical actuators may allow the intake and exhaust valves to continue to operate even though the intake and exhaust valves were commanded to a deactivated state. If the intake and exhaust valves continue to operate when the valve actuators are commanded to deactivate the valves, fresh air may be pumped to the engine's exhaust system where it may affect catalyst activity, thereby degrading vehicle emissions. Conversely, if the valves continue to be deactivated after the valve actuators are commanded to activate the valves, the engine may produce less power than is desired and fuel may accumulate in cylinders having valves that remain deactivated.

One way to determine whether or not valve actuators are activating and deactivating intake and exhaust poppet valves may be to measure cylinder pressure during a cycle of a cylinder. Alternatively, sensors may be placed to sense the position of the valve actuators to determine if the valve actuators reach their commanded position. However, cylinder pressure sensors and valve actuator position sensors may increase system cost significantly. Therefore, it may be desirable to provide a way of determining if intake and exhaust valve actuators are performing as is expected without having to deploy cylinder pressure sensors or valve actuator position sensors.

The inventor herein has recognized the above mentioned issues and has developed an engine operating method, comprising: rotating an engine without combusting fuel via a controller; indicating valve actuator degradation in response to lack of a temperature increase in an exhaust system after commanding activation of poppet valves of one or more engine cylinders while rotating the engine without combusting fuel; and adjusting operation of the engine in response to the indication of valve actuator degradation.

By sampling a temperature of gases flowing through an exhaust system, it may be possible to provide the technical result of determining whether or not intake and exhaust valve actuators are operating as is expected. In one example, hot exhaust gases may be trapped in one or more engine cylinders after combustion in the engine has ceased. At the same time, intake and exhaust valves of other engine cylinders may operate according to a four stroke engine cycle. The engine may be rotated by an electric machine, absent combustion within the engine, so that air flowing through the cylinders having operating intake and exhaust valves cools gases flowing through the exhaust system. After gas temperatures in the exhaust system have cooled, the trapped hot exhaust gases in cylinders having deactivated valves may then be released to the exhaust system by commanding formerly deactivated intake and exhaust valves to active. If the temperature in the exhaust system increases, it may be judged that the intake and exhaust valve actuators are operating as is expected. However, if the temperature in the exhaust system does not increase, it may be judged that the intake and exhaust valve operators are not operating as is expected because it may be inferred that exhaust gases remain trapped in the engine cylinder or that fresh air failed to enter cylinders and participate in combustion.

The present description may provide several advantages. In particular, the approach may provide improved diagnostics of engine cylinder valve deactivation devices and intake and exhaust valves. Additionally, the approach may provide cylinder diagnostics without increasing system cost. Further, the approach may reduce engine emissions if degraded valve operators are detected.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4 and 5 shows example cylinder valve deactivation mechanism diagnostic sequences; and FIGS. 6 and 7 show an example method for operating an engine.

DETAILED DESCRIPTION

Figure 2:
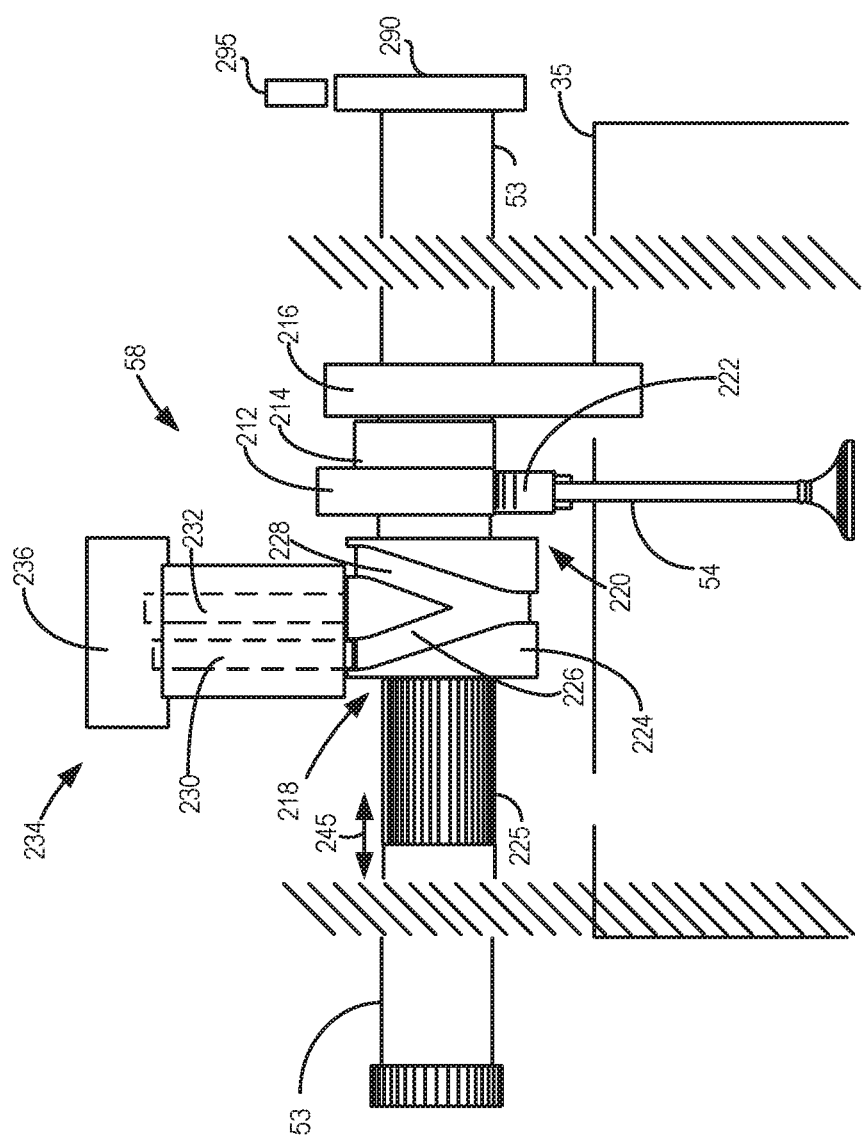
FIG. 2 shows an example cylinder valve activating/deactivating device.
Figure 3A:
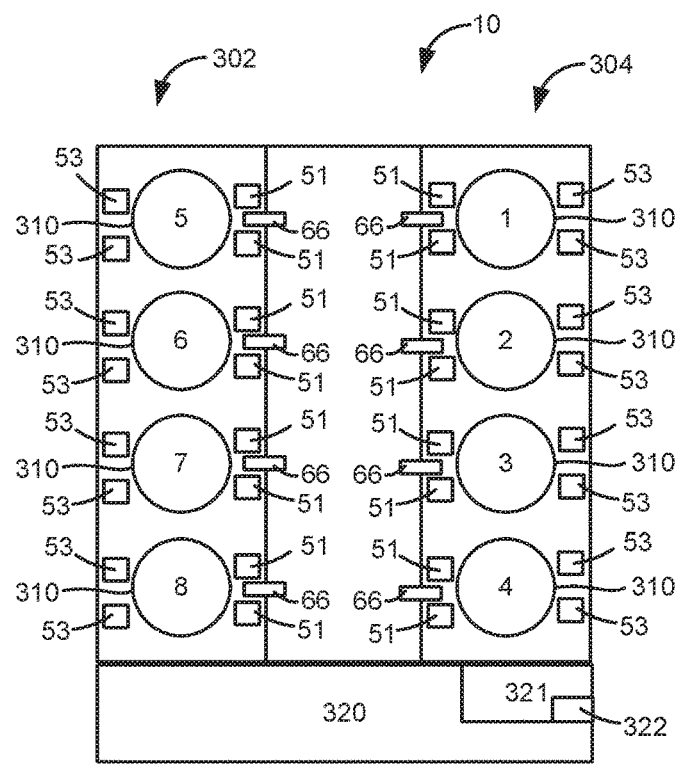
FIGS. 3A-3B show example engine cylinder configurations for the engine of FIG. 1.
Figure 3B:
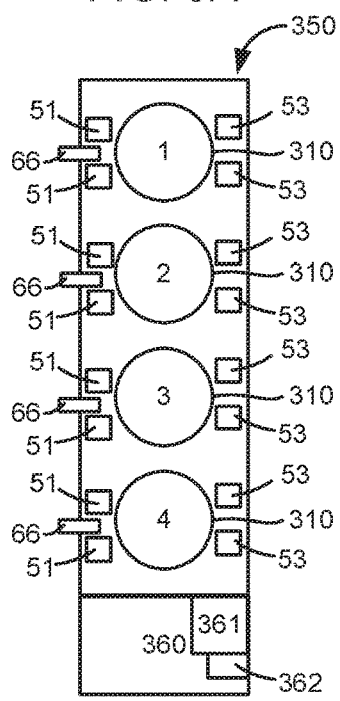
Figure 5:
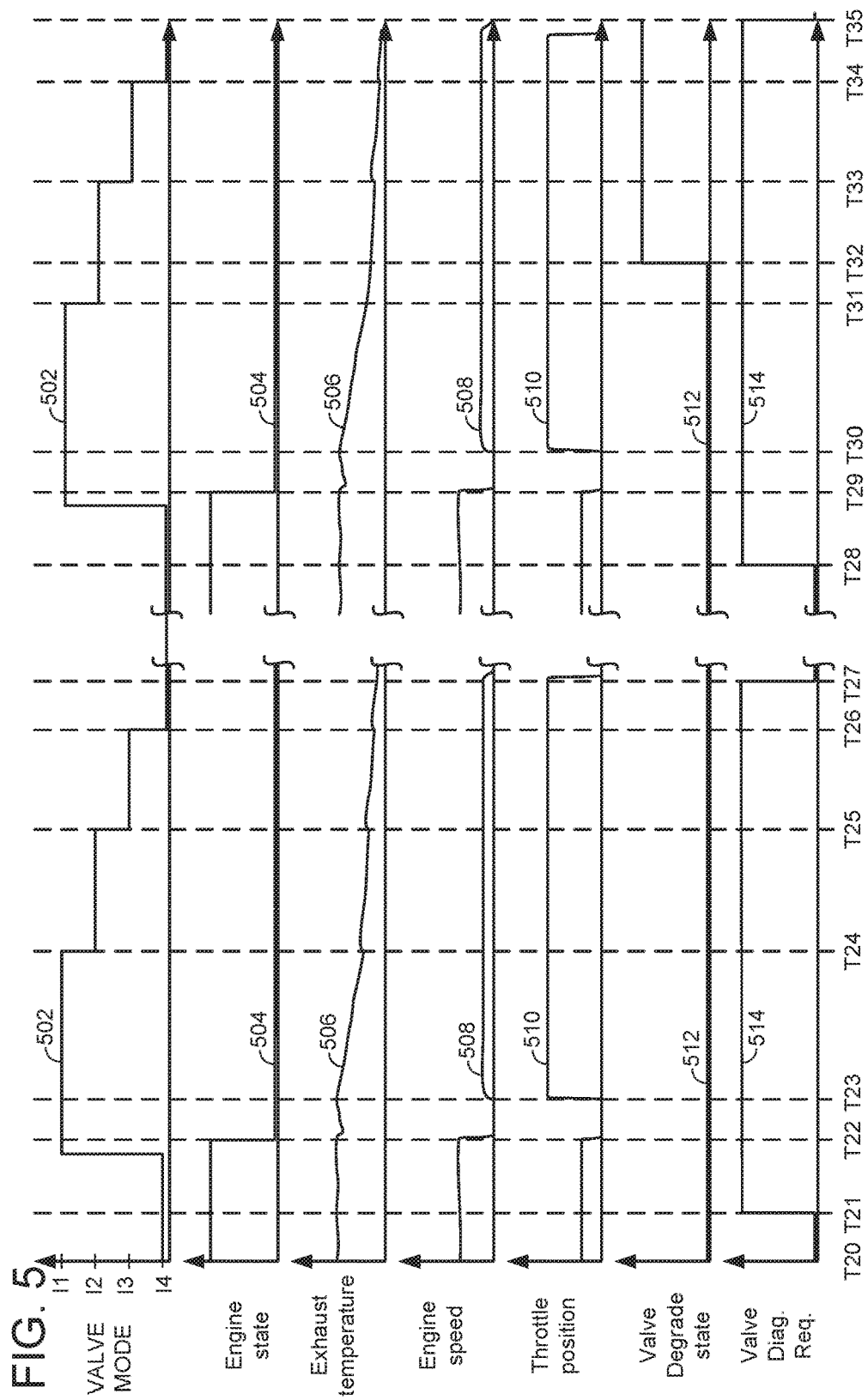

The present description is related to diagnosing operation of an engine that includes actuating mechanisms for cylinder poppet valves (e.g., intake and exhaust valves). The actuating mechanisms may be included in the engine to selectively deactivate and activate intake and exhaust valves of engine cylinders, thereby enabling and disabling engine cylinder modes. An example actuating mechanism for cylinder valves is shown in FIG. 2. Two example engine cylinder configurations are shown in FIGS. 3A and 3B. Sequences for determining the presence or absence of valve and valve actuator degradation are shown in FIGS. 4 and 5. The method of FIGS. 6 and 7 may be applied to diagnose the presence or absence of valve and valve actuator degradation.

Figure 1:
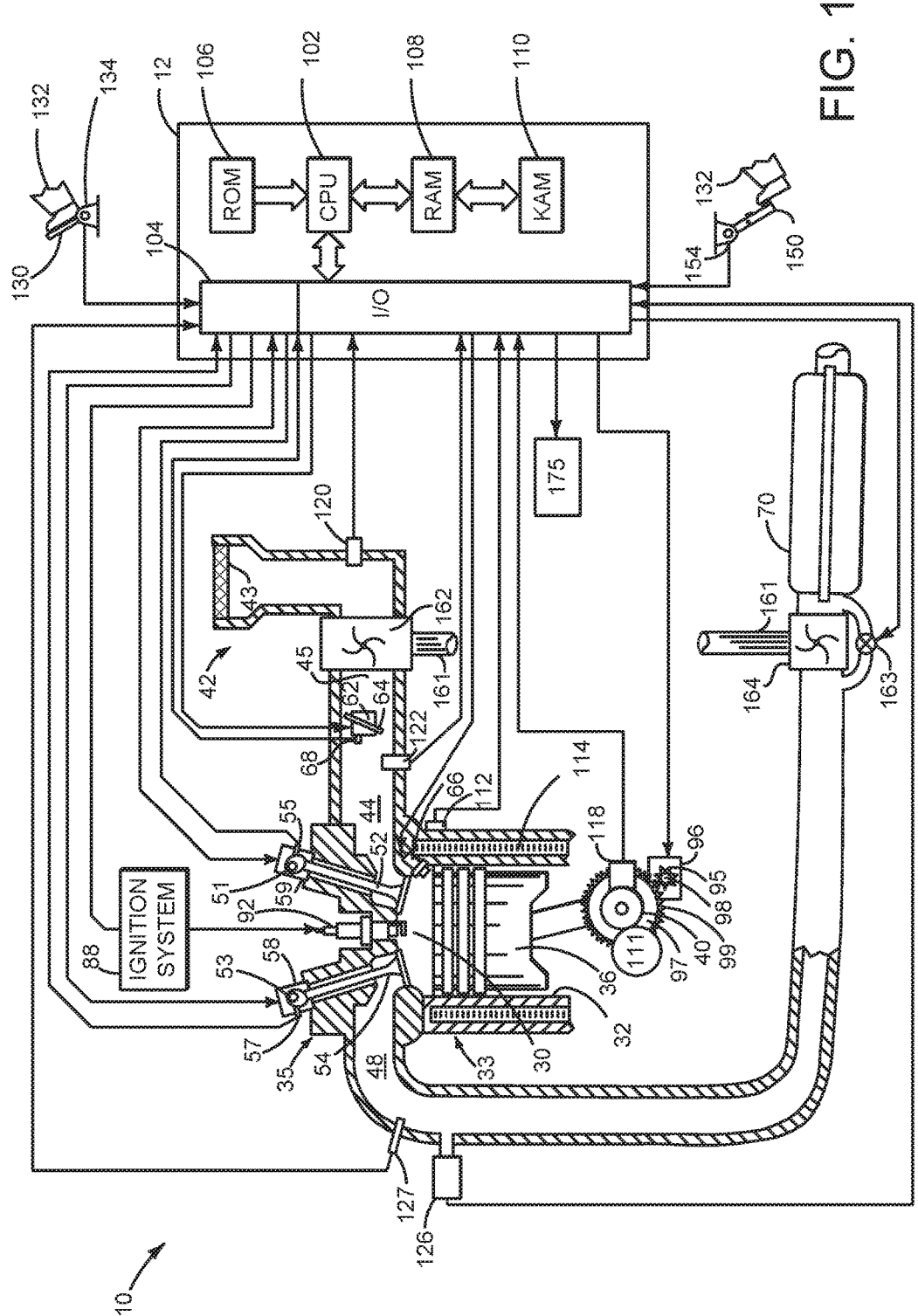
FIG. 1 shows a schematic diagram of one cylinder of an example engine system.

Referring to FIG. 1, internal combustion engine 10, comprising a plurality of cylinders, one cylinder of which is shown in FIG. 1, is controlled by electronic engine controller 12. The controller 12 receives signals from the various sensors in FIG. 1 and employs the various actuators of FIG. 1 to adjust engine operation based on received signals and instructions stored in memory of the controller. For example, if controller 12 detects degradation of a cylinder poppet valve or poppet valve actuator, controller 12 may limit engine torque production via limiting amounts of air and fuel that are delivered to the engine.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. In other examples, integrated starter/generator (ISG) 111 may rotate engine 10 and ISG 111 may be directly coupled to crankshaft 40 or coupled to crankshaft 40 via a belt.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve actuator device 59. Exhaust valve 54 may be selectively activated and deactivated by valve actuator device 58. Valve actuator devices 58 and 59 may be of the type shown in FIG. 2 or other known configurations.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Wastegate 163 may be adjusted via controller 12 to allow exhaust gases to selectively bypass turbine 164 to control the speed of compressor 162. Air filter 43 cleans air entering engine air intake 42. Throttle 62 is positioned downstream of compressor 162 in the direction of air flow into engine 10.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70 in exhaust system 11. Alternatively, a two-state exhaust gas oxygen sensor may be substituted for UEGO sensor 126. Engine exhaust system 11 includes exhaust manifold 48, temperature sensor 127, and converter 70. Converter 70 can include multiple catalyst bricks, in one example. In another example, multiple emission control devices, each with multiple bricks, can be applied. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 132, a measurement of engine manifold absolute pressure (MAP) from pressure sensor 122 coupled to intake manifold 44; an engine position sensor from a Hall effect sensor 118 sensing crankshaft 40 position; a measurement of air mass entering the engine from sensor 120 (e.g., mass air flow sensor); and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also provide status information (e.g., indications of degradation or required maintenance) or receive input via human/machine interface 175. Human/machine interface may be a touch screen panel, pushbutton interface, or other type of interface. During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 shows an example cylinder valve actuator 58 for application in engine 10 shown in FIG. 1. Cylinder valve actuator 58 adjusts a lift and/or valve opening duration of a cylinder exhaust valve 54 in response to engine operating conditions. Cylinder valve actuator 58 may provide zero valve lift for one or more engine cycles to deactivate cylinder exhaust valves 54. Exhaust camshaft 53 is shown positioned above a cylinder head 35 of an engine cylinder bank. Exhaust valve 54 is configured to open and close an exhaust port in a cylinder, such as the cylinder shown in FIG. 1. For example, exhaust valve 54 may be actuatable between an open position allowing gas exchange into or out of a cylinder and a closed position substantially blocking gas exchange into or out of the cylinder. It should be understood that though only one valve is shown in FIG. 2; however, engine 10 shown in FIG. 1 may include any number of cylinder valves. Further, a cylinder valve actuator similar to cylinder valve actuator 58 may be applied to engine intake valves. In addition, engine 10 of FIG. 1 may include any number of cylinders with associated valves and a variety of different cylinder and valve configurations may be used, e.g., V-6, I-4, I-6, V-12, opposed 4, and other engine types.

One or more cam towers or camshaft mounting regions may be coupled to cylinder head 35 to support exhaust camshaft 53. For example, cam tower 216 is shown coupled to cylinder head 35 adjacent to exhaust valve 54. Though FIG. 2 shows a cam tower coupled to the cylinder head, in other examples, the cam towers may be coupled to other components of an engine, e.g., to a camshaft carrier or the cam cover. The cam towers may support overhead camshafts and may separate the lift mechanisms positioned on the camshafts above each cylinder.

Exhaust valve 54 may operate in a plurality of lift and duration modes, e.g., a high valve lift, low or partial valve lift, short opening duration, long opening duration, and zero valve lift. For example, as described in more detail below, by adjusting cylinder cam mechanisms, the valves on one or more cylinders, e.g., exhaust valve 54, may be operated in different lift modes based on engine operating conditions.

Exhaust camshaft 53 may include a plurality of cam lobes configured to control the opening and closing of the exhaust valves. For example, FIG. 2 shows a first cam lobe 212 and a second cam lobe 214 positioned above valve 54. The cams lobes may have different shapes and sizes to form lift profiles used to adjust an amount and timing of a lifting of valve 54 while exhaust camshaft 53 rotates. For example, exhaust cam 212 may be a full lift cam lobe and cam 214 may be a zero lift cam lobe. Though, FIG. 2 shows two lift profiles associated with first cam 212 and second cam 214, it should be understood that any number of lift profile cams may be present, e.g., three different cam lobes.

Exhaust camshaft 53 includes a mechanism 218 coupled to the camshaft above the exhaust valve 54 for adjusting an amount of valve lift for that exhaust valve 54 and/or for deactivating that exhaust valve by changing a location of cam lobes along the camshaft relative to exhaust valve 54. For example, the cam lobes 212 and 214 may be slideably attached to the camshaft so that they can slide along the camshaft in an axial direction on a per-cylinder basis. For example, a plurality of cam lobes, e.g., cam lobes 212 and 214, positioned above each cylinder valve, e.g., exhaust valve 54, may be slid across the camshaft in directions indicated by arrow 245 to change a cam lobe profile coupled to the valve follower, e.g., follower 220 coupled to exhaust valve 54, to change the exhaust valve opening and closing durations and lift amounts. The valve cam follower 220 may include a roller finger follower (RFF) 222 which engages with a cam lobe positioned above valve 202. For example, in FIG. 2, roller 222 is shown engaging with full lift cam lobe 212.

Additional follower elements not shown in FIG. 2 may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders may each have only one exhaust valve and/or intake valve, or more than one intake and/or exhaust valves. In still other examples, exhaust valves and intake valves may be actuated by a common camshaft. However, in an alternate example, at least one of the intake valves and/or exhaust valves may be actuated by its own independent camshaft or other device.

An outer sleeve 224 is splined to exhaust camshaft 53 and is coupled to the cam lobes 212 and 214. Camshaft position relative to the engine crankshaft is determined via rotation sensing camshaft position sensor 295 and exhaust camshaft position indicator 290. Exhaust camshaft 53 may be coupled to a cam phaser that is used to vary the valve timing with respect to crankshaft position. By engaging a pin, e.g., one of the pins 230 or 232, into a grooved hub in the outer sleeve, the axial position of the sleeve can be repositioned so that a different cam lobe engages the cam follower coupled to exhaust valve 54 in order to change the lift of the exhaust valve 54. For example, sleeve 224 may include one or more displacing grooves, e.g., grooves 226 and 228, which extend around an outer circumference of the sleeve. The displacing grooves may have a helical configuration around the outer sleeve and, in some examples, may form a Y-shaped or V-shaped groove in the outer sleeve, where the Y-shaped or V-shaped groove is configured to engage two different actuator pins, e.g., first pin 230 and second pin 232, at different times in order to move the outer sleeve to change a lift profile for exhaust valve 54. Sleeve 224 is shown in a first position while pin 232 shifts sleeve 224 to the left side of FIG. 2. Sleeve 224 follows spline 225 in an axial direction along exhaust camshaft 53 when profiles are being switched. Further, a depth of each groove in sleeve 224 may decrease along a length of the groove so that after a pin is deployed into the groove from a home position, the pin is returned to the home position by the decreasing depth of the groove as the sleeve and camshaft rotate.

For example, as shown in FIG. 2, when first pin 230 is deployed into groove 226, outer sleeve 224 will shift in a direction toward cam tower 216 while exhaust camshaft 53 rotates, thereby positioning cam lobe 212 above valve 202 and changing the valve lift profile. In order to switch back to cam lobe 214, second pin 232 may be deployed into groove 228 which will shift outer sleeve 224 away from cam tower 216 to position cam lobe 214 above valve 202. In some examples, multiple outer sleeves containing lobes may be splined to exhaust camshaft 53. For example, outer sleeves may be coupled to cam lobes above every valve in engine 10 or a select number of cam lobes above the valves.

Actuator pins 230 and 232 are included in a cam lobe switching actuator 234 which adjusts the positions of the pins 230 and 232 in order to switch cam lobes positioned above a valve 202. Exhaust cam lobe switching actuator 234 includes an activating mechanism 236, which may be hydraulically powered, or electrically actuated, or combinations thereof. Activating mechanism 236 changes positions of the pins in order to change lift profiles of a valve. For example, activating mechanism 236 may be a coil coupled to both pins 230 and 232 so that when the coil is energized, e.g., via a current supplied thereto from the control system, a force is applied to both pins to deploy both pins toward the sleeve.

Referring now to FIG. 3A, an example multi-cylinder engine that includes two cylinder banks is shown. The engine includes cylinders and associated components as shown in FIG. 1. Engine 10 includes eight cylinders each of which are labeled 310. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively deactivated to improve engine fuel economy when less than the engine's full torque capacity is requested. For example, cylinders 2, 3, 5, and 8 (e.g., a fixed pattern of deactivated cylinders) may be deactivated during an engine cycle (e.g., two revolutions for a four stroke engine) and may be deactivated for a plurality of engine cycles while engine speed and load are constant or very slightly. During a different engine cycle, a second fixed pattern of cylinders 1, 4, 6, and 7 may be deactivated. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. Each cylinder includes variable intake valve operators 51 and variable exhaust valve operators 53. An engine cylinder may be deactivated by its variable intake valve operators 51 and variable exhaust valve operators holding intake and exhaust valves of the cylinder closed during an entire cycle of the cylinder. Fuel flow to the cylinder ceases when a cylinder is deactivated. An engine cylinder may be activated by its variable intake valve operators 51 and variable exhaust valve operators 53 opening and closing intake and exhaust valves of the cylinder during a cycle of the cylinder. Fuel is supplied to a cylinder that is activated, but valves of a cylinder may open and close during a cylinder cycle without supplying fuel to the cylinder during deceleration fuel shut-off. Engine 10 includes a first cylinder bank 304, which includes four cylinders 1, 2, 3, and 4. Engine 10 also includes a second cylinder bank 302, which includes four cylinders 5, 6, 7, and 8. Cylinders of each bank may be active or deactivated during a cycle of the engine.

Engine 10 is also shown coupled to transmission 320. Transmission 320 may be a fixed ratio transmission, dual clutch transmission, constant velocity transmission, or other known type of transmission. Sensor 322 may provide an indication of the position of shifter 321. For example, sensor 322 may indicate that transmission is engaged in park, neutral, reverse, or drive. The output of sensor 322 may be input to controller 12 of FIG. 1.

Referring now to FIG. 3B, an example multi-cylinder engine that includes one cylinder bank is shown. The engine includes cylinders and associated components as shown in FIG. 1. Engine 10 includes four cylinders 310. Each of the four cylinders is numbered and the numbers of the cylinders are included within the cylinders. Fuel injectors 66 selectively supply fuel to each of the cylinders that are activated (e.g., combusting fuel during a cycle of the engine with intake and exhaust valves opening and closing during a cycle of the cylinder that is active). Cylinders 1-4 may be selectively deactivated (e.g., not combusting fuel during a cycle of the engine with intake and exhaust valves held closed over an entire cycle of the cylinder being deactivated) to improve engine fuel economy when less than the engine's full torque capacity is requested. For example, cylinders 2 and 3 (e.g., a fixed pattern of deactivated cylinders) may be deactivated during a plurality of engine cycles (e.g., two revolutions for a four stroke engine). During a different engine cycle, a second fixed pattern cylinders 1 and 4 may be deactivated over a plurality of engine cycles. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. In this way, the deactivated engine cylinders may rotate or change from one engine cycle to the next engine cycle.

Engine 10 includes a single cylinder bank 350, which includes four cylinders 1-4. Cylinders of the single bank may be active or deactivated during a cycle of the engine. Each cylinder includes variable intake valve operators 51 and variable exhaust valve operators 53. An engine cylinder may be deactivated by its variable intake valve operators 51 and variable exhaust valve operators holding intake and exhaust valves of the cylinder closed during a cycle of the cylinder. Fuel flow is ceased to a cylinder that is deactivated. An engine cylinder may be activated by its variable intake valve operators 51 and variable exhaust valve operators 53 opening and closing intake and exhaust valves of the cylinder during a cycle of the cylinder. Fuel is supplied to a cylinder that is activated, but valves of a cylinder may open and close during a cylinder cycle without supplying fuel to the cylinder during deceleration fuel shut-off.

Engine 10 is also shown coupled to transmission 360. Transmission 360 may be a fixed ratio transmission, dual clutch transmission, constant velocity transmission, or other known type of transmission. Sensor 362 may provide an indication of the position of shifter 361. For example, sensor 362 may indicate that transmission is engaged in park, neutral, reverse, or drive. The output of sensor 362 may be input to controller 12 of FIG. 1.

Thus, the system of FIGS. 1-3B provides for an engine system, comprising: an engine including one or more cylinder valve deactivating mechanisms and an exhaust system; an electric machine; and a controller including executable instructions stored in non-transitory memory to adjust operation of the engine in response to an indication of degradation of the one or more cylinder valve deactivating mechanisms, the indication of degradation based on a temperature in the exhaust system while the electric machine is rotating the engine and while fuel is not supplied to the engine. The indication of valve or valve actuator degradation may be determined via an absence of a temperature increase in the engine's exhaust system. The engine system further comprises providing the indication of degradation of the one or more cylinder valve deactivation mechanisms when exhaust temperature does not increase while the electric machine is rotating the engine. The engine system includes where adjusting operation of the engine includes activating the one or more cylinder valve deactivating mechanisms. The engine system includes where adjusting operation of the engine includes ceasing to supply fuel to one or more engine cylinders. The engine system further comprises additional instructions to selectively activate groups of valve deactivating mechanisms at different times. The engine system further comprises additional instructions to open an engine throttle while rotating the engine.

Referring now to FIG. 4, a first example prophetic engine operating sequence for a four cylinder (14), four stroke, engine is shown. The operating sequence of FIG. 4 may be produced via the system of FIGS. 1-3B executing instructions of the method described in FIGS. 6 and 7. The plots of FIG. 4 are aligned in time and occur at the same time. Vertical markers at T0-T10 indicate times of particular interest during the sequence. The horizontal axis includes a break in time that is indicated between the two SSs located along the horizontal axis. The duration of the break in time may be long or short.

The first plot from the top of FIG. 4 represents commanded valve mode versus time. The vertical axis represents commanded valve mode. The horizontal axis represents time and time increases from the left side of the plot to the right side of the plot. In this example, the engine is capable of operating in only two valve modes at a point in time. The valve modes are indicated along the vertical axis and they include I2 mode for operating the engine as a two cylinder engine (e.g., two engine cylinders with intake and exhaust valves opening and closing during an engine cycle while valves of two cylinders remain closed during the engine cycle) and I4 mode for operating the engine as a four cylinder engine (e.g., all four engine cylinders with intake and exhaust valves opening and closing during an engine cycle). Trace 402 represents the engine valve mode state.

The second plot from the top of FIG. 4 represents an engine operating state versus time. The vertical axis represents engine operating state and the engine is operating (e.g., combusting fuel) when trace 404 is at a higher level near the vertical axis arrow. The engine is not operating (e.g., not combusting fuel) when trace 404 is at a lower level near the horizontal axis. The horizontal axis represents time and time increases from the left hand side of the plot to the right hand side of the plot. Trace 404 represents engine state.

The third plot from the top of FIG. 4 represents temperature in the engine exhaust system (e.g., temperature of gases in the engine exhaust system) versus time. The vertical axis represents temperature in the engine exhaust system and the temperature increases in the direction of the vertical axis arrow. The horizontal axis represents time and time increases from the left hand side of the plot to the right hand side of the plot. Trace 406 represents temperature in the engine exhaust system.

The fourth plot from the top of FIG. 4 represents engine speed versus time. The vertical axis represents engine speed and engine speed increases in the direction of the vertical axis arrow. The horizontal axis represents time and time increases from the left hand side of the plot to the right hand side of the plot. Trace 408 represents engine speed.

The fifth plot from the top of FIG. 4 represents engine throttle position versus time. The vertical axis represents engine throttle position and the opening amount of the engine throttle increases in the direction of the vertical axis arrow. The horizontal axis represents time and time increases from the left hand side of the plot to the right hand side of the plot. Trace 410 represents throttle position.

The sixth plot from the top of FIG. 4 represents valve and/or valve actuator degradation state versus time. The vertical axis represents valve and/or valve actuator degradation state and a valve and/or valve actuator is determined to be degraded when the valve degradation state trace is at a higher level near the vertical axis arrow. A valve and/or valve actuator is not determined to be degraded requested when the valve degradation state trace is at a lower level near the horizontal axis. The horizontal axis represents time and time increases from the left hand side of the plot to the right hand side of the plot. Trace 412 represents the valve degradation state.

The seventh plot from the top of FIG. 4 represents valve diagnostic request state versus time. The vertical axis represents valve diagnostic request state and a valve and/or valve actuator is requested to be diagnosed when the valve diagnostic request state trace is at a higher level near the vertical axis arrow. A valve diagnostic is not requested when the valve diagnostic request state trace is at a lower level near the horizontal axis. The horizontal axis represents time and time increases from the left hand side of the plot to the right hand side of the plot. Trace 414 represents the valve degradation state.

At time T0, the engine is operating in a four cylinder mode where all four engine cylinders are combusting fuel during a cycle of the engine. The intake and exhaust valves of each cylinder are opened and closed during an engine cycle. The exhaust system temperature is at a middle level indicating hot exhaust gases are in the engine cylinders and the exhaust system. The engine speed is at a middle level and the engine throttle is partially open. The valve degradation state indicates that valve and/or valve actuator are not degraded and the valve diagnostic state indicates that the valve diagnostic is not presently requested.

At time T1, the engine continues to operate in four cylinder mode, but a valve diagnostic is requested. The valve diagnostic may be requested responsive to vehicle operating conditions (e.g., distance traveled by a vehicle, hours of engine operation, engine air-fuel ratio variation, etc.). The exhaust system temperature remains at an elevated temperature and engine speed remains at a middle level. The throttle remains at a middle position and valve degradation is not indicated.

Just before time T2, an engine stop request is provided by a human or autonomous driver is asserted (not shown) and the engine valves of two engine cylinders are commanded deactivated to trap exhaust in the two engine cylinders. In this example, the valves that are commanded deactivated are transitioned to a deactivated state. The engine continues to operate and the exhaust system temperature remains at a middle level. The engine speed also remains at a middle level. The throttle remains partially open and valve degradation is not indicated.

At time T2, the engine is stopped (not combusting fuel) and the engine speed begins to decline. The engine includes two cylinders having activated intake and exhaust valves (e.g., intake and exhaust valves that open and close during an engine cycle) and two cylinders having intake and exhaust valves that are deactivated (e.g., intake and exhaust valves that are commanded held closed for an entire engine cycle). The exhaust temperature remains at a middle level and the engine speed is at a middle level when combustion ceases. Valve degradation is not indicated and the valve diagnostic request remains asserted.

Between time T2 and time T3, the engine stops rotating and valves of two cylinders are in an activated mode (e.g., the intake and exhaust valves will open and close during an engine cycle when the engine rotates) and valves of two cylinders are in a deactivated mode (e.g., the intake and exhaust valve do not open during an engine cycle when the engine rotates). The exhaust system temperature decreases due to a small amount of air passing through the engine without participating in combustion while the engine decelerates to zero rotating speed, then the exhaust system temperature increases as air flow stops and the engine exhaust system heats gases in the exhaust system. The throttle is fully closed and valve degradation is not indicated. The valve diagnostic request remains asserted to indicate that the valve diagnostic remains active.

At time T3, the engine is rotated via an electric machine (e.g., ISG 111 shown in FIG. 1) while valves of two cylinders remain activated and valves of two cylinders remain deactivated. Hot exhaust gas is trapped in the cylinders having deactivated intake and exhaust valves. Engine speed begins to increase and the engine is not combusting fuel. The throttle is opened to increase the flow of fresh air through the exhaust system. Valve and/or valve actuator degradation is not indicated and the valve diagnostic request remains asserted.

Between time T3 and time T4, fresh air is pumped into the exhaust system via the cylinders that have activated intake and exhaust valves. Hot exhaust gas remains trapped in engine cylinders with deactivated intake and exhaust valves and work is performed on the exhaust gases in the engine cylinders with deactivated intake and exhaust valves. The exhaust system temperature decreases as fresh air is pumped through the exhaust system. The engine continues to be rotated via the electric machine and the throttle remains open. Valve and/or valve actuator degradation is not indicated and the valve diagnostic state remains asserted.

At time T4, the deactivated intake and exhaust valves of two cylinders are commanded activated so that exhaust gases trapped in the cylinders with formerly deactivated intake and exhaust valves may be ejected into the exhaust system. The intake and exhaust valves activate in response to the command. The valve mode switches from 12 to 14 to indicate activation of the intake and exhaust valves. The engine is rotated by the electric machine and combustion is absent in engine cylinders. Engine speed continues at its previous level and the throttle remains open. Valve and/or valve actuator degradation is not indicated and the valve diagnostic request remains asserted.

Between time T4 and time T5, the exhaust temperature increases as hot gases are released from the two cylinders that previously had deactivated intake and exhaust valves. The increase in exhaust temperature indicates that the intake and exhaust valves of the previously two deactivated cylinders are operating as is expected. All engine intake and exhaust valves are activated and the engine is not combusting. The engine continues to be rotated at its prior speed via the electric machine and the throttle remains open. Valve and/or valve actuator degradation is not indicated and the valve diagnostic state remains asserted.

At time T5, the valve diagnostic request is withdrawn and the electric machine ceases to rotate the engine. The engine throttle is closed and valve degradation is not indicated. The engine remains in I4 valve mode and the engine is not combusting fuel.

In this way, temperature of an exhaust system may confirm operation of intake and exhaust valves. The engine need not be combusting air and fuel while the valve diagnostic is performed. Further, by not combusting fuel in the engine, exhaust gas temperature may be controlled to indicate the presence or absence of valve and/or valve actuator degradation. Consequently, the person driving the vehicle does not have to be disturbed to perform the valve diagnostic. The sequence continues until the time break between time T5 and time T6.

At time T6, the engine is operating in four cylinder mode and a valve diagnostic is requested. The exhaust system temperature is at an elevated temperature and engine speed at a middle level. The throttle is at a middle position and valve degradation is not indicated.

Just before time T7, an engine stop request is provided by a human or autonomous driver is asserted (not shown) and the intake and exhaust valves of two engine cylinders are commanded deactivated to trap exhaust in the two engine cylinders. However, in this example, the intake and exhaust valves that are commanded to deactivate do not deactivate. The engine continues to operate and the exhaust system temperature remains at a middle level. The engine speed also remains at a middle level. The throttle remains partially open and valve degradation is not indicated.

At time T7, the engine is stopped (not combusting fuel) and the engine speed begins to decline. The engine may be stopped via ceasing to supply fuel to the engine. The engine includes two cylinders having activated intake and exhaust valves and two cylinders having intake and exhaust valves that are commanded deactivated, but that are not actually deactivated. The exhaust temperature remains at a middle level and the engine speed is at a middle level when combustion ceases. Valve and/or valve actuator degradation is not indicated and the valve diagnostic request remains asserted.

Between time T7 and time T8, the engine stops rotating and intake and exhaust valves of all cylinders are activated, but intake and exhaust valves of two cylinders remain commanded deactivated. The exhaust system temperature decreases due to a small amount of air passing through the engine without participating in combustion as the engine decelerates to zero rotational speed, then the exhaust system temperature increases as air flow stops and the engine exhaust system heats gases in the exhaust system. The throttle is fully closed and valve and/or valve actuator degradation is not indicated. The valve diagnostic request remains asserted to indicate that the valve diagnostic remains active.

At time T8, the engine is rotated via an electric machine (e.g., ISG 111 shown in FIG. 1) while intake and exhaust valves of all four cylinders remain activated and intake and exhaust valves of two cylinders are commanded deactivated. Hot exhaust gas would be trapped in the cylinders having deactivated intake and exhaust valves, but in this example, the commanded deactivated intake and exhaust valves continue to operate. Engine speed begins to increase and the engine is not combusting fuel. The throttle is opened to increase the flow of fresh air through the exhaust system. Valve and/or valve actuator degradation is not indicated and the valve diagnostic request remains asserted.

Between time T8 and time T9, fresh air is pumped into the exhaust system via all cylinders. Thus, air is pumped through cylinders that have intake and exhaust valves commanded deactivated. The fresh air that is pumped through the engine decreases the temperature in the exhaust system. The engine continues to be rotated via the electric machine and the throttle remains open. Valve and/or valve actuator degradation is not indicated and the valve diagnostic state remains asserted.

At time T9, the intake and exhaust valves of the two cylinders that are commanded deactivated are commanded activated to determine if the temperature in the exhaust system increases in response to reactivating the valves that were commanded deactivated. The valve mode switches from 12 to 14 to indicate all valves are commanded active. The engine is rotated by the electric machine and combustion is absent in engine cylinders. Engine speed continues at its previous level and the throttle remains open. Valve and/or valve actuator degradation is not indicated and the valve diagnostic request remains asserted.

Between time T9 and time T10, the exhaust temperature continues to decline since exhaust gas is not ejected to the exhaust system from cylinders that had intake and exhaust valves previously commanded deactivated. The continued decrease in exhaust temperature indicates that the intake and exhaust valves of the previously two deactivated cylinders did not operate as is expected. All engine intake and exhaust valves are activated and the engine is not combusting fuel. The engine continues to be rotated at its prior speed via the electric machine and the throttle remains open. Valve and/or valve actuator degradation is now indicated because the exhaust system temperature failed to increase after reactivating the deactivated intake and exhaust valves. The valve diagnostic state remains asserted. Engine actuators may be adjusted in response to the indication of valve and/or valve actuator degradation as is described in further detail in the description of method 600.

At time T10, the valve diagnostic request is withdrawn and the electric machine ceases to rotate the engine. The engine throttle is closed and valve degradation is not indicated. The engine remains in I4 valve mode and the engine is not combusting fuel.

In this way, temperature of an exhaust system may confirm degradation of intake and exhaust valves and their valve operators. The engine need not be combusting air and fuel while the intake and exhaust valve diagnostic is performed. Consequently, the person driving the vehicle does not have to be disturbed to perform the valve diagnostic.

Referring now to FIG. 5, an example prophetic engine operating sequence for a four cylinder (14), four stroke, engine is shown. The operating sequence of FIG. 5 may be produced via the system of FIGS. 1-3B executing instructions of the method described in FIGS. 6 and 7. The plots of FIG. 5 are aligned in time and occur at the same time. Vertical markers at T20-T35 indicate times of particular interest during the sequence. The horizontal axis includes a break in time that is indicated between the two SSs located along the horizontal axis. The duration of the break in time may be long or short.

The first plot from the top of FIG. 5 represents commanded valve mode versus time. The vertical axis represents commanded valve mode. The horizontal axis represents time and time increases from the left side of the plot to the right side of the plot. In this example, the engine is capable of operating in one of four valve modes at a point in time. The valve modes are indicated along the vertical axis and include I1 mode for operating the engine as a single cylinder engine (e.g., one engine cylinder with intake and exhaust valves opening and closing during an engine cycle while valves of three cylinders remain closed during the engine cycle), I2 mode for operating the engine as a two cylinder engine (e.g., two engine cylinders with intake and exhaust valves opening and closing during an engine cycle while valves of two cylinders remain closed during the engine cycle), I3 mode for operating the engine as a three cylinder engine (e.g., three engine cylinders with intake and exhaust valves opening and closing during an engine cycle while valves of one cylinder remain closed during the engine cycle), and I4 mode for operating the engine as a four cylinder engine with all intake and exhaust valves opening and closing during an engine cycle. Trace 502 represents the engine valve mode state.

The second plot from the top of FIG. 5 represents an engine operating state versus time. The vertical axis represents engine operating state and the engine is operating (e.g., combusting fuel) when trace 504 is at a higher level near the vertical axis arrow. The engine is not operating (e.g., not combusting fuel) when trace 504 is at a lower level near the horizontal axis. The horizontal axis represents time and time increases from the left hand side of the plot to the right hand side of the plot. Trace 504 represents engine state.

The third plot from the top of FIG. 5 represents temperature in the engine exhaust system (e.g., temperature of gases in the engine exhaust system) versus time. The vertical axis represents temperature in the engine exhaust system and the temperature increases in the direction of the vertical axis arrow. The horizontal axis represents time and time increases from the left hand side of the plot to the right hand side of the plot. Trace 506 represents temperature in the engine exhaust system.

The fourth plot from the top of FIG. 5 represents engine speed versus time. The vertical axis represents engine speed and engine speed increases in the direction of the vertical axis arrow. The horizontal axis represents time and time increases from the left hand side of the plot to the right hand side of the plot. Trace 508 represents engine speed.

The fifth plot from the top of FIG. 5 represents engine throttle position versus time. The vertical axis represents engine throttle position and the opening amount of the engine throttle increases in the direction of the vertical axis arrow. The horizontal axis represents time and time increases from the left hand side of the plot to the right hand side of the plot. Trace 510 represents throttle position.

The sixth plot from the top of FIG. 5 represents valve and/or valve actuator degradation state versus time. The vertical axis represents valve and/or valve actuator degradation state and a valve and/or valve actuator is determined to be degraded when the valve degradation state trace is at a higher level near the vertical axis arrow. A valve and/or valve actuator is not determined to be degraded requested when the valve degradation state trace is at a lower level near the horizontal axis. The horizontal axis represents time and time increases from the left hand side of the plot to the right hand side of the plot. Trace 512 represents the valve degradation state.

The seventh plot from the top of FIG. 5 represents valve diagnostic request state versus time. The vertical axis represents valve diagnostic request state and a valve and/or valve actuator is requested to be diagnosed when the valve diagnostic request state trace is at a higher level near the vertical axis arrow. A valve diagnostic is not requested when the valve diagnostic request state trace is at a lower level near the horizontal axis. The horizontal axis represents time and time increases from the left hand side of the plot to the right hand side of the plot. Trace 514 represents the valve degradation state.

At time T20, the engine is operating in a four cylinder mode where all four engine cylinders are combusting fuel during a cycle of the engine. The intake and exhaust valves of each cylinder are opened and closed during an engine cycle. The exhaust system temperature is at a middle level indicating hot exhaust gases are in the engine cylinders and the exhaust system. The engine speed is at a middle level and the engine throttle is partially open. The valve degradation state indicates that valve and/or valve actuator are not degraded and the valve diagnostic state indicates that the valve diagnostic is not presently requested.

At time T21, the engine continues to operate in four cylinder mode, but a valve diagnostic is requested. The valve diagnostic may be requested responsive to vehicle operating conditions (e.g., distance traveled by a vehicle, hours of engine operation, engine air-fuel ratio variation, etc.). The exhaust system temperature remains at an elevated temperature and engine speed remains at a middle level. The throttle remains at a middle position and valve degradation is not indicated.

Just before time T22, an engine stop request is provided by a human or autonomous driver is asserted (not shown) and the engine valves of three engine cylinders are commanded deactivated to trap exhaust in the three engine cylinders. In this example, the valves that are commanded deactivated are transitioned to a deactivated state. The engine continues to operate and the exhaust system temperature remains at a middle level. The engine speed also remains at a middle level. The throttle remains partially open and valve degradation is not indicated.

At time T22, the engine is stopped (not combusting fuel) and the engine speed begins to decline. The engine includes one cylinder having activated intake and exhaust valves (e.g., intake and exhaust valves that open and close during an engine cycle) and three cylinders having intake and exhaust valves that are deactivated (e.g., intake and exhaust valves that are commanded held closed for an entire engine cycle). The exhaust temperature remains at a middle level and the engine speed is at a middle level when combustion ceases. Valve degradation is not indicated and the valve diagnostic request remains asserted.

Between time T22 and time T23, the engine stops rotating and valves of one cylinder are in an activated mode (e.g., the intake and exhaust valves will open and close during an engine cycle when the engine rotates) and valves of three cylinders are in a deactivated mode (e.g., the intake and exhaust valve do not open during an engine cycle when the engine rotates). The exhaust system temperature decreases due to a small amount of air passing through the engine without participating in combustion as the engine decelerates to zero rotational speed, then the exhaust system temperature increases as air flow stops and the engine exhaust system heats gases in the exhaust system. The throttle is fully closed and valve degradation is not indicated. The valve diagnostic request remains asserted to indicate that the valve diagnostic remains active.

At time T23, the engine is rotated via an electric machine (e.g., ISG 111 shown in FIG. 1) while valves of one cylinder remain activated and valves of three cylinders remain deactivated. Hot exhaust gas is trapped in the cylinders having deactivated intake and exhaust valves. Engine speed begins to increase and the engine is not combusting fuel. The throttle is opened to increase the flow of fresh air through the exhaust system. Valve degradation is not indicated and the valve diagnostic request remains asserted.

Between time T23 and time T24, fresh air is pumped into the exhaust system via the one cylinder having activated intake and exhaust valves. Hot exhaust gas remains trapped in engine cylinders with deactivated intake and exhaust valves and work is performed on the exhaust gases in the engine cylinders with deactivated intake and exhaust valves. The exhaust system temperature decreases as fresh air is pumped through the exhaust system. The engine continues to be rotated via the electric machine and the throttle remains open. Valve degradation is not indicated and the valve diagnostic state remains asserted.

At time T24, the deactivated intake and exhaust valves of two cylinders are commanded activated so that exhaust gases in the second cylinder with formerly deactivated intake and exhaust valves may be ejected into the exhaust system. The intake and exhaust valves activate in response to the command. The valve mode switches from I1 to I2 to indicate commanded activation of the intake and exhaust valves of two cylinders. The engine is rotated by the electric machine and combustion is absent in engine cylinders. Engine speed continues at its previous level and the throttle remains open. Valve and/or valve actuator degradation is not indicated and the valve diagnostic request remains asserted.

Between time T24 and time T25, the exhaust temperature increases a small amount as hot gases are released from the one cylinder that previously had deactivated intake and exhaust valves. The increase in exhaust temperature indicates that the intake and exhaust valves of the previously deactivated cylinder (e.g., the second cylinder) are operating as is expected. The engine is not combusting fuel and it continues to be rotated via the electric machine. The engine continues to be rotated at its prior speed and the throttle remains open. Valve and/or valve actuator degradation is not indicated and the valve diagnostic state remains asserted.

At time T25, the deactivated intake and exhaust valves of three cylinders are commanded activated so that exhaust gases in the third cylinder with formerly deactivated intake and exhaust valves may be ejected into the exhaust system. The intake and exhaust valves activate in response to the command. The valve mode switches from I2 to I3 to indicate commanded activation of the intake and exhaust valves of three cylinders. The engine is rotated by the electric machine and combustion is absent in engine cylinders. Engine speed continues at its previous level and the throttle remains open. Valve and/or valve actuator degradation is not indicated and the valve diagnostic request remains asserted.

Between time T25 and time T26, the exhaust temperature increases a small amount as hot gases are released from the one cylinder that previously had deactivated intake and exhaust valves. The increase in exhaust temperature indicates that the intake and exhaust valves of the previously deactivated cylinder (e.g., the third cylinder) are operating as is expected. The engine is not combusting fuel and it continues to be rotated via the electric machine. The engine continues to be rotated at its prior speed and the throttle remains open. Valve and/or valve actuator degradation is not indicated and the valve diagnostic state remains asserted.

At time T26, the intake and exhaust valves of all four cylinders are commanded activated so that exhaust gases in the fourth cylinder with formerly deactivated intake and exhaust valves may be ejected into the exhaust system. The intake and exhaust valves activate in response to the command. The valve mode switches from I3 to I4 to indicate commanded activation of the intake and exhaust valves of all four cylinders. The engine is rotated by the electric machine and combustion is absent in engine cylinders. Engine speed continues at its previous level and the throttle remains open. Valve degradation is not indicated and the valve diagnostic request remains asserted.

Between time T26 and time T27, the exhaust temperature increases a small amount as hot gases are released from the one cylinder that previously had deactivated intake and exhaust valves. The increase in exhaust temperature indicates that the intake and exhaust valves of the previously deactivated cylinder (e.g., the fourth cylinder) are operating as is expected. The engine is not combusting fuel and it continues to be rotated via the electric machine. The engine continues to be rotated at its prior speed and the throttle remains open. Valve and/or valve actuator degradation is not indicated and the valve diagnostic state remains asserted.

At time T27, the valve diagnostic request is withdrawn and the electric machine ceases to rotate the engine. The engine throttle is closed and valve degradation is not indicated. The engine remains in I4 valve mode and the engine is not combusting fuel.

In this way, temperature of an exhaust system may confirm operation of intake and exhaust valves of individual cylinders. The engine need not be combusting air and fuel while the valve diagnostic is performed. Consequently, a more through intake and exhaust valve diagnostic may be performed. The sequence continues until the time break between time T27 and time T28.

Before time T28, the engine is operating in a four cylinder mode where all four engine cylinders are combusting fuel during a cycle of the engine. The intake and exhaust valves of each cylinder are opened and closed during an engine cycle. The exhaust system temperature is at a middle level indicating hot exhaust gases are in the engine cylinders and the exhaust system. The engine speed is at a middle level and the engine throttle is partially open. The valve degradation state indicates that valve and/or valve actuator are not degraded and the valve diagnostic state indicates that the valve diagnostic is not presently requested.

At time T28, the engine continues to operate in four cylinder mode, but a valve diagnostic is requested. The exhaust system temperature remains at an elevated temperature and engine speed remains at a middle level. The throttle remains at a middle position and valve degradation is not indicated.

Just before time T29, an engine stop request is provided by a human or autonomous driver is asserted (not shown) and the engine valves of three engine cylinders are commanded deactivated to trap exhaust in the two engine cylinders. In this example, the valves of the second cylinder that are commanded to deactivate fail to transition to a deactivated state, but the valves of the remaining cylinders follow their respective commands. The engine continues to operate and the exhaust system temperature remains at a middle level. The engine speed also remains at a middle level. The throttle remains partially open and valve degradation is not indicated.

At time T29, the engine is stopped (not combusting fuel) and the engine speed begins to decline. The engine includes one cylinder having activated intake and exhaust valves (e.g., intake and exhaust valves that open and close during an engine cycle) and three cylinders having intake and exhaust valves that are deactivated (e.g., intake and exhaust valves that are commanded held closed for an entire engine cycle). The exhaust temperature remains at a middle level and the engine speed is at a middle level when combustion ceases. Valve and/or valve actuator degradation is not indicated and the valve diagnostic request remains asserted.

Between time T29 and time T30, the engine stops rotating and valves of one cylinder are in an activated mode (e.g., the intake and exhaust valves will open and close during an engine cycle when the engine rotates) and valves of three cylinders are in a deactivated mode (e.g., the intake and exhaust valve do not open during an engine cycle when the engine rotates). The exhaust system temperature decreases due to a small amount of air passing through the engine without participating in combustion as the engine decelerates to zero rotational speed, then the exhaust system temperature increases as air flow stops and the engine exhaust system heats gases in the exhaust system. The throttle is fully closed and valve degradation is not indicated. The valve diagnostic request remains asserted to indicate that the valve diagnostic remains active.

At time T30, the engine is rotated via an electric machine (e.g., ISG 111 shown in FIG. 1) while valves of one cylinder are commanded activated and valves of three cylinders are commanded deactivated. However, valves of the first and second cylinder remain activated due to degradation of the valve actuator of the second cylinder. Hot exhaust gas is trapped in the cylinders having deactivated intake and exhaust valves. Engine speed begins to increase and the engine is not combusting fuel. The throttle is opened to increase the flow of fresh air through the exhaust system. Valve and/or valve actuator degradation is not indicated and the valve diagnostic request remains asserted.

Between time T30 and time T31, fresh air is pumped into the exhaust system via two cylinders having activated intake and exhaust valves, despite valves of three cylinders being commanded deactivated. Hot exhaust gas remains trapped in engine cylinders with deactivated intake and exhaust valves and work is performed on the exhaust gases in the engine cylinders with deactivated intake and exhaust valves. The exhaust system temperature decreases as fresh air is pumped through the exhaust system via two cylinders. The engine continues to be rotated via the electric machine and the throttle remains open. Valve and/or valve actuator degradation is not indicated and the valve diagnostic state remains asserted.

At time T31, the deactivated intake and exhaust valves of the second cylinder are commanded activated along with the intake and exhaust valves of the first cylinder so that it may be determined if hot exhaust was trapped in the second cylinder with formerly deactivated intake and exhaust valves. The intake and exhaust valves activate in response to the command. The valve mode switches from I1 to I2 to indicate commanded activation of the intake and exhaust valves of two cylinders. The engine is rotated by the electric machine and combustion is absent in engine cylinders. Engine speed continues at its previous level and the throttle remains open. Valve degradation is not indicated and the valve diagnostic request remains asserted.

Between time T31 and time T32, the exhaust temperature decreases without increasing since the intake and exhaust valves of the second cylinder did not deactivate when they were commanded to deactivate. The decrease in exhaust temperature indicates that the intake and exhaust valves of the previously deactivated cylinder (e.g., the second cylinder) did not operate as was expected. The engine is not combusting fuel and it continues to be rotated via the electric machine. The engine continues to be rotated at its prior speed and the throttle remains open. Valve degradation is not indicated and the valve diagnostic state remains asserted.

At time T32, valve and/or valve actuator degradation is indicated. Because the intake and exhaust valves of the second cylinder were commanded activated individually and the exhaust temperature did not increase, the second cylinder may be specifically indicated as the cylinder with degraded intake and exhaust valves. Engine actuators may be adjusted in response to the indication of valve and/or valve actuator degradation as is described in further detail in the description of method 600.

At time T33, the deactivated intake and exhaust valves of the third cylinder are commanded activated along with the intake and exhaust valves of the first and second cylinders so that it may be determined if hot exhaust was trapped in the third cylinder with formerly deactivated intake and exhaust valves. The intake and exhaust valves are activated in response to the command. The valve mode switches from I2 to I3 to indicate commanded activation of the intake and exhaust valves of three cylinders. The engine is rotated by the electric machine and combustion is absent in engine cylinders. Engine speed continues at its previous level and the throttle remains open. Valve and/or valve actuator degradation is still indicated and the valve diagnostic request remains asserted so that intake and exhaust valves of the remaining cylinders may be diagnosed.

Between time T33 and time T34, the exhaust temperature increases a small amount as hot gases are released from the one cylinder that previously had deactivated intake and exhaust valves. The increase in exhaust temperature indicates that the intake and exhaust valves of the previously deactivated cylinder (e.g., the third cylinder) are operating as is expected. The engine is not combusting fuel and it continues to be rotated via the electric machine. The engine continues to be rotated at its prior speed and the throttle remains open. Valve and/or valve actuator degradation is still indicated and the valve diagnostic state remains asserted.

At time T34, the intake and exhaust valves of all four cylinders are commanded activated so that exhaust gases in the fourth cylinder with formerly deactivated intake and exhaust valves may be ejected into the exhaust system. The intake and exhaust valves activate in response to the command. The valve mode switches from I3 to I4 to indicate commanded activation of the intake and exhaust valves of all four cylinders. The engine is rotated by the electric machine and combustion is absent in engine cylinders. Engine speed continues at its previous level and the throttle remains open. Valve and/or valve actuator degradation is indicated and the valve diagnostic request remains asserted.

Between time T34 and time T35, the exhaust temperature increases a small amount as hot gases are released from the one cylinder that previously had deactivated intake and exhaust valves. The increase in exhaust temperature indicates that the intake and exhaust valves of the previously deactivated cylinder (e.g., the fourth cylinder) are operating as is expected. The engine is not combusting fuel and it continues to be rotated via the electric machine. The engine continues to be rotated at its prior speed and the throttle remains open. Valve degradation is still indicated and the valve diagnostic state remains asserted.

At time T35, the valve diagnostic request is withdrawn and the electric machine ceases to rotate the engine. The engine throttle is closed and valve degradation is not indicated. The engine remains in I4 valve mode and the engine is not combusting fuel.

In this way, temperature of an exhaust system may confirm operation of intake and exhaust valves of individual cylinders. The engine need not be combusting air and fuel while the valve diagnostic is performed. Consequently, a more through intake and exhaust valve diagnostic may be performed.

Figure 6:
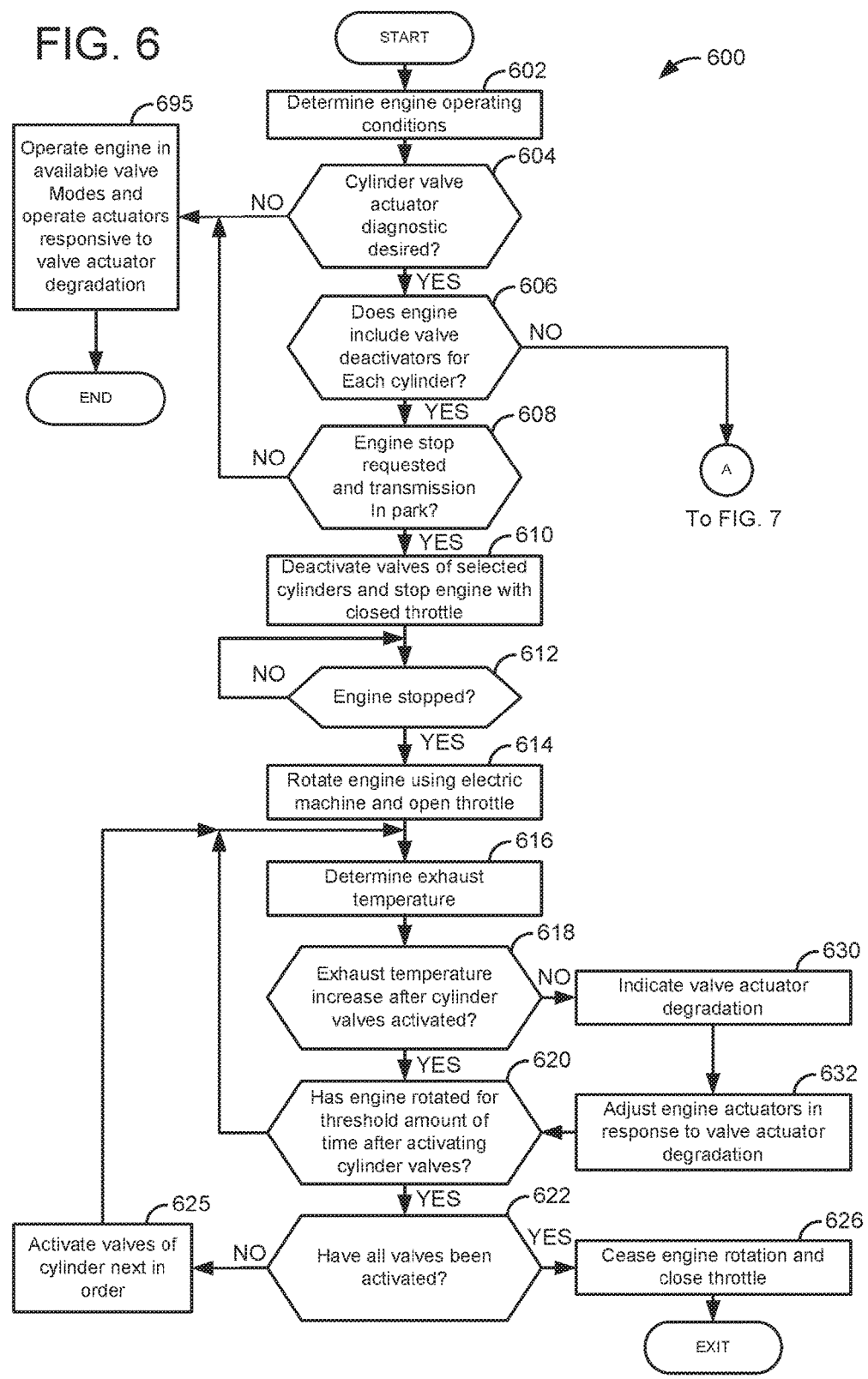

Referring now to FIGS. 6 and 7, a method for operating an engine and determining valve actuator degradation via engine exhaust temperature is described. The method of FIGS. 6 and 7 may be incorporated into and may cooperate with the system of FIGS. 1-3B. Further, at least portions of the method of FIGS. 6 and 7 may be incorporated as executable instructions stored in non-transitory memory while other portions of the method may be performed via a controller transforming operating states of devices and actuators in the physical world. Additionally, the engine may be operating via combusting fuel and rotating according to a four stroke cycle when method 600 is executed.

At 602, method 600 determines engine operating conditions. Engine operating conditions may include but are not limited to engine operating state, engine speed, engine load, engine temperature, vehicle speed, engine exhaust system temperature, an actual total number of intake and exhaust valve profile switches since the vehicle was manufactured, and distance driven by the vehicle. Method 600 proceeds to 604 after engine operating conditions are determined.

At 604, method 600 judges whether or not cylinder valve actuator diagnostics are desired. In one example, cylinder valve actuator diagnostics may be desired after a vehicle travels a predetermined distance, after cylinder valves have been deactivated more than a threshold amount of times, and if vehicle operating conditions are desirable for cylinder valve actuator diagnostics. Cylinder valve actuator diagnostics may be desirable after vehicle passengers have exited a vehicle, if a vehicle is being remotely started, or if the vehicle is a hybrid vehicle and driver demand is low enough to cease engine operation. If method 600 judges that cylinder valve actuator diagnostics are desired, the answer is yes and method 600 proceeds to 606. Otherwise, the answer is no and method 600 proceeds to 695.

At 695, method 600 operates the engine with intake and exhaust poppet valves that are operable to open and close during an engine cycle. Method 600 may also operate the engine with poppet valves and actuators that activate intake and exhaust valves according to commands. For example, if the engine is a V8 engine and it includes V6, V4, and V2 cylinder modes, all modes may be available and entered subject to driver demand torque and vehicle speed. However, if a valve actuator is diagnosed as degraded such that a valve may not be activated and deactivated as commanded, the engine may be prevented from entering V2 and V4 cylinder modes. The particular cylinder mode that is activated may depend on driver demand torque and engine or vehicle speed. Further, if an intake or exhaust valve or valve actuator is determined to be degraded, method 600 may limit the amount of torque the engine produces based on the degraded valve or valve actuator. For example, method 600 may prevent fuel flow to a cylinder that has an intake or exhaust valve that does not open and close in response to commands. Further, method 600 may prevent spark delivery to the same cylinder. The engine operates via combusting fuel according to a four stroke cycle. Method 600 proceeds to exit.

At 606, method 600 judges if the engine includes valve actuators for activating (e.g., activated intake and exhaust valves open and close during each engine cycle) and deactivating (e.g., deactivated intake and exhaust valves do not open and close during each engine cycle) each valve of each engine cylinder. Method 600 may judge if the engine includes valve actuators for activating and deactivating each poppet valve of each engine cylinder according to a value of a variable that indicates the engine's configuration. If the value of the variable indicates that the engine includes valve actuators for activating and deactivating each poppet valve of each cylinder, then the answer is yes and method 600 proceeds to 608. Otherwise, the answer is no and method 600 proceeds to 650.

At 608, method 600 judges if an engine stop is requested and if the transmission is engaged in park. In one example, an engine stop may be requested via a human driver providing input to a key switch, pushbutton, or other device that has a sole purpose of requesting an engine stop or start. Alternatively, an autonomous driver may request an engine stop via adjusting a value of a variable in controller memory. Similarly, method 600 may judge if the vehicle's transmission is engaged in park via determining a position of a shifter via a sensor. If method 600 judges that an engine stop is requested and the vehicle's transmission is engaged in park, the answer is yes and method 600 proceeds to 610. Otherwise, the answer is no and method 600 proceeds to 695.

At 610, method 600 deactivates intake and exhaust valves of selected engine cylinders, stops combustion in the engine, and closes the engine's throttle. In one example as shown in FIG. 5, all intake and exhaust valves of all engine cylinders with the exception of intake and exhaust valves of one engine cylinder may be deactivated such that the intake and exhaust valves remain closed an entire time the engine rotates through an engine cycle (e.g., two revolutions). In other examples, intake and exhaust valves of predetermined engine cylinders may be deactivated. The intake and exhaust valves of the cylinders are deactivated such that each cylinder retains and does not exhaust combusted gases. Method 600 proceeds to 612.

At 612, method 600 judges if combustion in the engine is stopped. Combustion may be allowed to continue until each cylinder that includes intake and exhaust valves that are deactivated holds combusted exhaust products. For example, if cylinder number one is on an intake stroke when the engine stop is requested, then the engine continues combustion until the air inducted into cylinder number one participates in combustion with fuel injected into cylinder number one. The combustion byproducts then remain trapped in cylinder number one by not opening the exhaust valves of cylinder number one after combustion occurs in the compression stroke of cylinder number one. Similarly, combustion may continue in other engine cylinders until each engine cylinder that is commanded to have deactivated intake and exhaust valves is trapping combustion byproducts (e.g., exhaust gases). If method 600 judges that combustion in the engine has stopped, the answer is yes and method 600 proceeds to 614. Otherwise, the answer is no and method 600 returns to 612.

At 614, method 600 rotates the engine via an electric machine (e.g., ISG 111 or starter 96 of FIG. 1). By rotating the engine, gases in the exhaust system may be cooled so that hot exhaust gases exiting cylinders having formerly deactivated intake and exhaust valves may be distinguished from cool air that passes through cylinders with activated intake and exhaust valves. The engine exhaust system is cooled by flowing air through cylinders with activated valves while the engine rotates. Method 600 proceeds to 616.

At 616, method 600 determines engine exhaust system temperature. In one example, method 600 may determine a temperature of exhaust gases in the engine exhaust system via a temperature sensor. Output of the temperature sensor is provided to the controller to determine engine exhaust system temperature. Method 600 proceeds to 618.

At 618, method 600 judges if a temperature of the exhaust system has increased after intake and exhaust valves of a cylinder that were deactivated are reactivated. Method 600 may judge that temperature of the exhaust system has is increased if output of a temperature sensor indicates a higher exhaust temperature immediately after (within two engine cycles) intake and exhaust valves of a cylinder are reactivated as compared to exhaust temperature immediately before the intake and exhaust valves are activated. If method 600 judges that a higher exhaust temperature is observed, the answer is yes and method 600 proceeds to 620. If method 600 judges that a higher exhaust temperature is not observed, then method 600 proceeds to 620 if method 600 enters step 618 without having reactivated intake and exhaust valves after deactivating intake and exhaust valves of selected cylinders at 610. If method 600 judges that a higher exhaust temperature is not observed and that method 600 has reactivated intake and exhaust valves after deactivating intake and exhaust valves of selected cylinders at 610, then the answer is no and method 600 proceeds to 630.

At 630, method 600 indicates valve degradation is present for the cylinder that has most recently had its intake and exhaust valves reactivated. The indication may be made via changing a value of a variable in memory. Further, method 600 may provide a visual or audible indication in a passenger compartment of the vehicle via a human/machine interface. Method 600 proceeds to 632.

At 632, method 600 adjusts engine actuators in response to valve and valve actuator degradation. In one example, where intake and/or exhaust valves and/or valve actuators of a cylinder are determined to be degraded, method 600 ceases to supply fuel to the cylinder having degraded valves and/or valve actuators. In another example, method 600 may prevent other engine cylinders from being deactivated based on intake and/or exhaust valves and/or valve actuators so that the engine is able to operate in only a fraction of a total number of available cylinder modes. For example, a V8 engine may be allowed to operate in only V8 and V6 modes and may be prevented from entering V4 cylinder mode. Further, method 600 may adjust the engine throttle responsive to a first engine airflow and MAP relationship when intake and exhaust valve or valve actuator degradation is not present, and method 600 may adjust the engine throttle responsive to a second engine airflow and MAP relationship when intake and exhaust valve or valve actuator degradation is present. The engine actuators may be adjusted responsive to valve actuator degradation when the engine is restarted and combusting fuel. Method 600 proceeds to 620 after adjusting engine actuators.

At 620, method 600 judges if the engine has been rotating for a threshold amount of time since a most recent time when intake and exhaust valves of a cylinder were commanded activated. For example, intake and exhaust valves of cylinder number four may be commanded activated at time t1, if method 600 judges that a threshold amount of time has passed since time t1, then the answer is yes and method 600 proceeds to 622. If method 600 judges that the engine has been rotating for a threshold amount of time since a most recent time when intake and exhaust valves of a cylinder were commanded activated, the answer is yes and method 600 proceeds to 622. Otherwise, the answer is no and method 600 returns to 616.

At 622, method 600 judges if all intake and exhaust valves of all engine cylinders have been activated after select intake and exhaust valves were deactivated at 610. In one example, activation and/or deactivation of intake and exhaust valves of a cylinder may be indicated by a value of variables stored in controller memory. If the values of the variables indicate that all intake and exhaust valves of all engine cylinders of the engine have been commanded activated, the answer is yes and method 600 proceeds to 626. Otherwise, the answer is no and method 600 proceeds to 625.

At 626, method 600 ceases engine rotation via the electric machine and closes the throttle. Method 600 exits after ceasing engine rotation and closing the engine throttle.

At 625, method 600 activates intake and exhaust valves of a next cylinder that had its valves deactivated at 610. For example, if a four cylinder engine had intake and exhaust valves deactivated for cylinders 2, 3, and 4 at 610 and intake and exhaust valves of cylinder number 2 have already been activated, then method 600 may activate the intake and exhaust valves of cylinder number 3. Method 600 returns to 616.

In this way, method 600 may selectively deactivate and activate intake and exhaust valves of individual cylinders where individual control over intake and exhaust valves is provided. If a temperature increase in the exhaust system is detected when the deactivated intake and exhaust valves are reactivated, it may be determined that the intake and exhaust valves and their actuators are operating as is expected. If a temperature increase is not detected in the engine exhaust system when the deactivated intake and exhaust valves are reactivated, it may be determined that the intake and exhaust valves and their actuators are not operating as is expected.

At 650, method 600 judges if an engine stop is requested and if the transmission is engaged in park. In one example, an engine stop may be requested via a human driver providing input to a key switch, pushbutton, or other device that has a sole purpose of requesting an engine stop or start.

Alternatively, an autonomous driver may request an engine stop via adjusting a value of a variable in controller memory. Similarly, method 600 may judge if the vehicle's transmission is engaged in park via determining a position of a shifter via a sensor. If method 600 judges that an engine stop is requested and the vehicle's transmission is engaged in park, the answer is yes and method 600 proceeds to 652. Otherwise, the answer is no and method 600 proceeds to 696.

At 696, method 600 operates the engine with intake and exhaust poppet valves that are operable to open and close during an engine cycle. Method 600 may also operate the engine with poppet valves and actuators that activate intake and exhaust valves according to commands. For example, if the engine is a V8 engine and it includes V6, V4, and V2 cylinder modes, all modes may be available and entered subject to driver demand torque and vehicle speed. However, if a valve actuator is diagnosed as degraded such that a valve may not be activated and deactivated as commanded, the engine may be prevented from entering V2 and V4 cylinder modes. The particular cylinder mode that is activated may depend on driver demand torque and engine or vehicle speed. Further, if an intake or exhaust valve or valve actuator is determined to be degraded, method 600 may limit the amount of torque the engine produces based on the degraded valve or valve actuator. For example, method 600 may prevent fuel flow to a cylinder that has an intake or exhaust valve that does not open and close in response to commands. Further, method 600 may prevent spark delivery to the same cylinder. The engine operates via combusting fuel according to a four stroke cycle. Method 600 proceeds to exit.

At 652, method 600 deactivates intake and exhaust valves of selected engine cylinders, stops combustion in the engine, and closes the engine's throttle. In one example as shown in FIG. 4, all intake and exhaust valves of a fraction of engine cylinders may be deactivated such that the intake and exhaust valves remain closed an entire time the engine rotates through an engine cycle (e.g., two revolutions). For example, intake and exhaust valves of cylinders number 1 and 3 of a four cylinder engine may be deactivated. In one example, the engine may not be able to deactivate intake and exhaust valves of individual cylinders. Rather, it may only be allowed to deactivate a group of cylinders. Method 600 deactivates intake and exhaust valves of engine cylinders and proceeds to 654.

At 654, method 600 judges if combustion in the engine is stopped. Combustion may be allowed to continue until each cylinder that includes intake and exhaust valves that are deactivated holds combusted exhaust products. For example, if cylinder number one is on an intake stroke when the engine stop is requested, then the engine continues combustion until the air inducted into cylinder number one participates in combustion with fuel injected into cylinder number one. The combustion byproducts then remain trapped in cylinder number one by not opening the exhaust valves of cylinder number one after combustion occurs in the compression stroke of cylinder number one. Similarly, combustion may continue in other engine cylinders until each engine cylinder that is commanded to have deactivated intake and exhaust valves is trapping combustion byproducts (e.g., exhaust gases). If method 600 judges that combustion in the engine has stopped, the answer is yes and method 600 proceeds to 656. Otherwise, the answer is no and method 600 returns to 654.

At 656, method 600 rotates the engine via an electric machine (e.g., ISG 111 or starter 96 of FIG. 1). By rotating the engine, gases in the exhaust system may be cooled so that hot exhaust gases exiting cylinders having formerly deactivated intake and exhaust valves may be distinguished from cool air that passes through cylinders with activated intake and exhaust valves. Method 600 proceeds to 658.

At 658, method 600 determines engine exhaust system temperature. In one example, method 600 may determine a temperature of exhaust gases in the engine exhaust system via a temperature sensor. Output of the temperature sensor is provided to the controller to determine engine exhaust system temperature. Method 600 proceeds to 660.

At 660, method 600 judges if a temperature of the exhaust system has increased after intake and exhaust valves of a cylinder that were deactivated are reactivated. Method 600 may judge that temperature of the exhaust system has is increased if output of a temperature sensor indicates a higher exhaust temperature immediately after (within two engine cycles) intake and exhaust valves of one or more cylinders are reactivated as compared to exhaust temperature immediately before the intake and exhaust valves are activated. If method 600 judges that a higher exhaust temperature is observed, the answer is yes and method 600 proceeds to 662. If method 600 judges that a higher exhaust temperature is not observed, then method 600 proceeds to 662 if method 600 enters step 660 without having reactivated intake and exhaust valves after deactivating intake and exhaust valves of selected cylinders at 652. If method 600 judges that a higher exhaust temperature is not observed and that method 600 has commanded reactivated intake and exhaust valves after deactivating intake and exhaust valves of selected cylinders at 652, then the answer is no and method 600 proceeds to 670.

At 670, method 600 indicates valve degradation is present for the cylinder or cylinders that have most recently had their intake and exhaust valves reactivated. The indication may be made via changing a value of a variable in memory. Further, method 600 may provide a visual or audible indication in a passenger compartment of the vehicle via a human/machine interface. Method 600 proceeds to 672.

At 672, method 600 adjusts engine actuators in response to valve and/or valve actuator degradation. In one example, where intake and/or exhaust valves and/or valve actuators of a cylinder are determined to be degraded, method 600 ceases to supply fuel to the cylinder having degraded valves and/or valve actuators. In another example, method 600 may prevent other engine cylinders from being deactivated based on intake and/or exhaust valves and/or valve actuators so that the engine is able to operate in only a fraction of a total number of available cylinder modes. For example, a V8 engine may be allowed to operate in only V8 and V6 modes and may be prevented from entering V4 cylinder mode. Further, method 600 may adjust the engine throttle responsive to a first engine airflow and MAP relationship when intake and exhaust valve or valve actuator degradation is not present, and method 600 may adjust the engine throttle responsive to a second engine airflow and MAP relationship when intake and exhaust valve or valve actuator degradation is present. The engine actuators may be adjusted responsive to valve actuator degradation when the engine is restarted and combusting fuel. Method 600 proceeds to 662 after adjusting engine actuators.

At 662, method 600 judges if the engine has been rotating for a threshold amount of time since a most recent time when intake and exhaust valves of a cylinder were commanded activated. For example, intake and exhaust valves of cylinder numbers one and four of a four cylinder engine may be commanded activated at time t1, if method 600 judges that a threshold amount of time has passed since time t1, then the answer is yes and method 600 proceeds to 664. If method 600 judges that the engine has been rotating for a threshold amount of time since a most recent time when intake and exhaust valves of one or more cylinders were commanded activated, the answer is yes and method 600 proceeds to 664. Otherwise, the answer is no and method 600 returns to 658.

At 664, method 600 judges if all intake and exhaust valves of all engine cylinders have been activated after select intake and exhaust valves were deactivated at 652. In one example, activation and/or deactivation of intake and exhaust valves of a cylinder may be indicated by a value of variables stored in controller memory. If the values of the variables indicate that all intake and exhaust valves of all engine cylinders of the engine have been commanded activated, the answer is yes and method 600 proceeds to 666. Otherwise, the answer is no and method 600 proceeds to 665.

At 666, method 600 ceases engine rotation via the electric machine and closes the throttle. Method 600 exits after ceasing engine rotation and closing the engine throttle.

At 665, method 600 activates intake and exhaust valves of a next cylinder that had its valves deactivated at 652. For example, if a four cylinder engine had intake and exhaust valves deactivated for cylinders 2 and 3 at 652 and intake and exhaust valves of cylinders numbered 2 and 3 have not already been activated, then method 600 may activate the intake and exhaust valves of cylinders numbered 2 and 3. Method 600 returns to 658.

In this way, method 600 may selectively deactivate and activate intake and exhaust valves of cylinders included in a group of cylinders where individual control over intake and exhaust valves is not provided. If a temperature increase is detected when the deactivated intake and exhaust valves are reactivated, it may be determined that the intake and exhaust valves and their actuators are operating as is expected. If a temperature increase is not detected when the deactivated intake and exhaust valves are reactivated, it may be determined that the intake and exhaust valves and their actuators are not operating as is expected.

Thus, method 600 provides for an engine operating method, comprising: rotating an engine without combusting fuel via a controller; indicating valve actuator degradation in response to lack of a temperature increase in an exhaust system after commanding activation of poppet valves of one or more engine cylinders while rotating the engine without combusting fuel; and adjusting operation of the engine in response to the indication of valve actuator degradation. The method further comprises determining the lack of temperature increase via output of a temperature sensor. The method further comprising detecting a lack of temperature increase in the exhaust system. The method includes where adjusting engine operation includes activating all cylinders of the engine. The method includes where adjusting engine operation includes ceasing to supply fuel to one or more engine cylinders.

In some examples, the method further comprises rotating the engine with intake and exhaust valves of one or more cylinders operating while rotating the engine without combusting fuel before commanding activation of the poppet valves. The method includes where the poppet valves include intake valves and exhaust valves. The method includes where the engine is rotated via an integrated starter/generator. The method further comprises indicating absence of valve actuator degradation in response to a temperature increase in the exhaust system. The method further comprises deactivating poppet valves of the one or more engine cylinders before or during rotating the engine without combusting fuel.

Method 600 also provides for an engine operating method, comprising: requesting to diagnose one or more intake and exhaust valves; deactivating intake and exhaust poppet valves of a first cylinder during an engine stop in response to a request to diagnose one or more intake and exhaust valves; rotating an engine without combusting fuel via a controller; indicating valve actuator degradation in response to an absence of an increase of a temperature in an exhaust system after activating the intake and exhaust poppet valves of the first cylinder while rotating the engine without combusting fuel; and adjusting operation of the engine in response to the indication of valve actuator degradation. The method includes detecting an absence of an increase in temperature in the exhaust system after activating intake and exhaust valves. The method includes where deactivating intake and exhaust poppet valves includes holding the intake and exhaust poppet valves closed for an entire engine cycle. The method further comprises indicating lack of valve actuator degradation in response to a presence of the increase of the temperature in the exhaust system after activating the intake and exhaust poppet valves. The method further comprises deactivating intake and exhaust poppet valves of a second cylinder during the engine stop. The method further comprises indicating valve actuator degradation in response to an absence of an increase of a temperature in an exhaust system after activating the intake and exhaust poppet valves of the second cylinder while rotating the engine without combusting fuel, the intake and exhaust poppet valves of the second cylinder activated a predetermined amount of time after activating the intake and exhaust poppet valves of the first cylinder. The method includes detecting an absence of an increase of a temperature in the exhaust system after activating intake and exhaust valves of a second cylinder.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
   rotating an engine without combusting fuel via a controller;
   indicating valve actuator degradation in response to lack of a temperature increase in an exhaust system after commanding activation of poppet valves of one or more engine cylinders while rotating the engine without combusting fuel; and adjusting operation of the engine in response to the indication of valve actuator degradation.

2. The method of claim 1, further comprising determining the lack of temperature increase via output of a temperature sensor.

3. The method of claim 1, where adjusting engine operation includes activating all cylinders of the engine.

4. The method of claim 1, where adjusting engine operation includes ceasing to supply fuel to one or more engine cylinders.

5. The method of claim 1, further comprising rotating the engine with intake and exhaust valves of one or more cylinders operating while rotating the engine without combusting fuel before commanding activation of the poppet valves.

6. The method of claim 1, where the poppet valves include intake valves and exhaust valves.

7. The method of claim 1, where the engine is rotated via an integrated starter/generator.

8. The method of claim 1, further comprising indicating absence of valve actuator degradation in response to a temperature increase in the exhaust system.

9. The method of claim 8, further comprising deactivating poppet valves of the one or more engine cylinders before or during rotating the engine without combusting fuel.

10. An engine operating method, comprising:
deactivating intake and exhaust poppet valves of a first cylinder during an engine stop in response to a request to diagnose one or more intake and exhaust valves;
rotating an engine without combusting fuel via a controller;
indicating valve actuator degradation in response to an absence of an increase of a temperature in an exhaust system after activating the intake and exhaust poppet valves of the first cylinder while rotating the engine without combusting fuel; and
adjusting operation of the engine in response to the indication of valve actuator degradation.

11. The method of claim 10, where deactivating intake and exhaust poppet valves includes holding the intake and exhaust poppet valves closed for an entire engine cycle.

12. The method of claim 10, further comprising indicating lack of valve actuator degradation in response to a presence of the increase of the temperature in the exhaust system after activating the intake and exhaust poppet valves.

13. The method of claim 10, further comprising deactivating intake and exhaust poppet valves of a second cylinder during the engine stop.

14. The method of claim 13, further comprising indicating valve actuator degradation in response to an absence of an increase of a temperature in an exhaust system after activating the intake and exhaust poppet valves of the second cylinder while rotating the engine without combusting fuel, the intake and exhaust poppet valves of the second cylinder activated a predetermined amount of time after activating the intake and exhaust poppet valves of the first cylinder.

15. An engine system, comprising:
an engine including one or more cylinder valve deactivating mechanisms and an exhaust system;
an electric machine; and
a controller including executable instructions stored in non-transitory memory to adjust operation of the engine in response to an indication of degradation of the one or more cylinder valve deactivating mechanisms, the indication of degradation based on a temperature in the exhaust system while the electric machine is rotating the engine and while fuel is not supplied to the engine.

16. The engine system of claim 15, further comprising providing the indication of degradation of the one or more cylinder valve deactivation mechanisms when exhaust temperature does not increase while the electric machine is rotating the engine.

17. The engine system of claim 15, where adjusting operation of the engine includes activating the one or more cylinder valve deactivating mechanisms.

18. The engine system of claim 15, where adjusting operation of the engine includes ceasing to supply fuel to one or more engine cylinders.

19. The engine system of claim 15, further comprising additional instructions to selectively activate groups of valve deactivating mechanisms at different times.

20. The engine system of claim 15, further comprising additional instructions to open an engine throttle while rotating the engine.

* * * * *